United States Patent
Kim et al.

(10) Patent No.: US 9,088,666 B2
(45) Date of Patent: Jul. 21, 2015

(54) APPARATUS AND METHOD FOR CONTROLLING FUNCTIONS OF MOBILE TERMINAL

(75) Inventors: Gi-Oh Kim, Gunpo-si (KR); Jong-Ho Park, Yongin-si (KR); Hyun-Sik Shim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 356 days.

(21) Appl. No.: 12/798,211

(22) Filed: Mar. 30, 2010

(65) Prior Publication Data

US 2010/0245241 A1    Sep. 30, 2010

(30) Foreign Application Priority Data

Mar. 30, 2009 (KR) .................. 10-2009-0026822

(51) Int. Cl.
*G09G 5/00* (2006.01)
*H04M 1/725* (2006.01)

(52) U.S. Cl.
CPC ................... *H04M 1/72583* (2013.01)

(58) Field of Classification Search
CPC ............... G09G 5/00; G06F 3/14; G06F 9/44; G06F 3/00
USPC ............. 345/156, 148; 382/190; 715/810
See application file for complete search history.

(56) References Cited

U.S. PATENT DOCUMENTS

| | | | |
|---|---|---|---|
| 5,731,813 A * | 3/1998 | O'Rourke et al. | 715/810 |
| 6,005,576 A * | 12/1999 | Kojima et al. | 715/810 |
| 6,661,438 B1 * | 12/2003 | Shiraishi et al. | 715/835 |
| 2006/0007318 A1 * | 1/2006 | Kanayama et al. | 348/211.3 |
| 2007/0124677 A1 * | 5/2007 | de los Reyes et al. | 715/705 |

FOREIGN PATENT DOCUMENTS

KR    1020070005208 A    1/2007

OTHER PUBLICATIONS

Translated Preliminary Rejection dated Feb. 6, 2015 in connection with Korean Patent Application 10-2009-0026822, 10 pages.

\* cited by examiner

*Primary Examiner* — Tony N Ngo

(57) ABSTRACT

A portable terminal includes an apparatus for controlling an operation of a mobile terminal. More particularly, an apparatus and a method sets a menu to control a mobile terminal in a specific region of an image stored in advance. A relevant function is performed by selecting the specific region of the image in which the menu has been set in the mobile terminal, thereby performing the relevant function fast and conveniently without separately selecting a menu (entering a menu). The apparatus includes a controller. The controller selects a specific region from an output image, sets a menu for controlling a function of the mobile terminal at the specific region, and stores the image where the menu has been set.

20 Claims, 4 Drawing Sheets

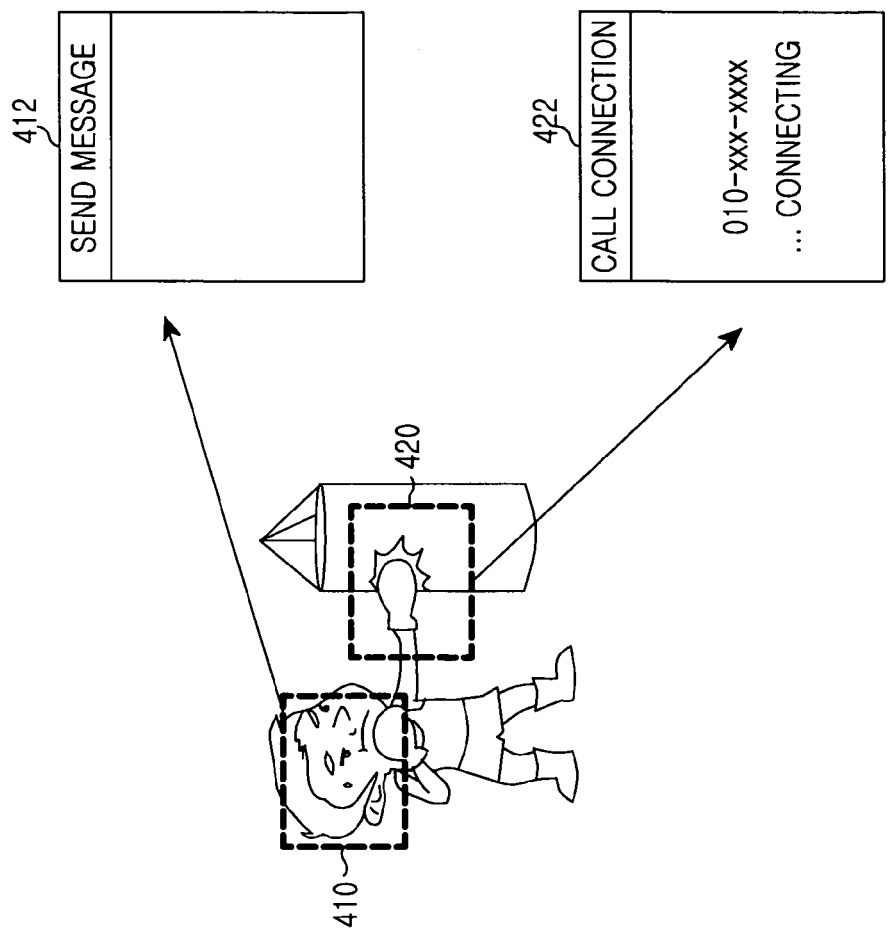
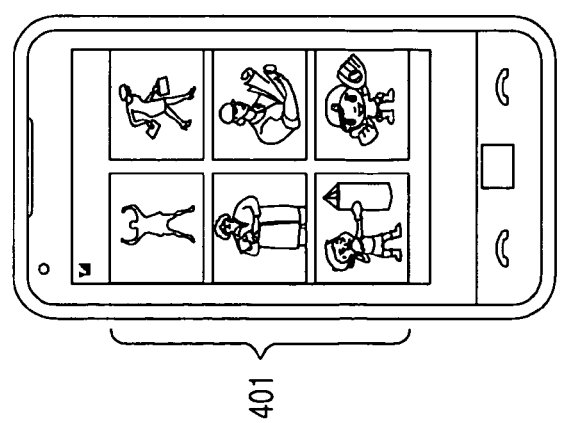
FIG.4B
FIG.4A

APPARATUS AND METHOD FOR CONTROLLING FUNCTIONS OF MOBILE TERMINAL

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Mar. 30, 2009 and assigned Serial No. 10-2009-0026822, the entire disclosure of which is hereby incorporated by reference.

TECHNICAL FIELD OF THE INVENTION

The present invention relates to an apparatus and a method for controlling an operation of a mobile terminal. More particularly, the present invention relates to an apparatus and a method for setting a menu for controlling a mobile terminal at a specific region of an image stored in advance. A relevant function is performed by selecting the specific region of the image in which the menu has been set in the mobile terminal, thereby performing the relevant function quickly and conveniently without separately selecting a menu (entering a menu).

BACKGROUND OF THE INVENTION

Recently, a mobile terminal has become an indispensable gadget in modern society and is widely used regardless of age or sex, prompting service providers and terminal manufacturers to competitively develop products (or services) in order to differentiate themselves from competitors.

For example, the mobile terminal has evolved into a multimedia apparatus that can provide a phonebook, games, a Short Message Service (SMS), electronic (e)-mail, a Motion Picture Expert Group Audio Layer-3 (MP3) player, a schedule management function, a digital camera, wireless Internet service, and other various features.

To use the above-mentioned features, a user of the mobile terminal selects a plurality of menus and uses a relevant feature.

For example, when a user of the mobile terminal intends to use a phonebook feature, the user may need to view recent communication records or enter a phonebook menu. That is, when the user of the mobile terminal intends to use a phonebook feature using recent communication records, the user selects a menu showing the recent communication records, views a list of phone numbers to which phone communication or short message services have been transmitted/received recently, clicks a desired item, and decides whether to send a short message or make a phone call. A method of using a phonebook feature by executing the phonebook menu similarly needs to display a menu showing contents of a phonebook, and then perform the same procedure.

The above-described methods have a problem of having to enter a mode for performing a relevant function by performing a plurality of menu selecting steps. When connection with a relevant counterpart has not been made frequently, the face of the counterpart may not be recognized with the name while a phonebook function is performed, making it difficult to place a phone call or transmit a short message.

The above-described problem not only applies in the phonebook context but also occurs throughout the entire operation control (function control) of the mobile terminal, decreasing the convenience of the mobile terminal.

Therefore, an apparatus and a method for controlling functions of a mobile terminal that resolve the above-described problems are desired.

SUMMARY OF THE INVENTION

To address the above-discussed deficiencies of the prior art, a primary aspect of the present invention is to address at least the above-mentioned problems and/or disadvantages and to provide at least the advantages described below. Accordingly, an aspect of the present invention is to provide an apparatus and a method for simplifying menu execution of a mobile terminal.

Another aspect of the present invention is to provide an apparatus and a method for mapping a shortcut for executing a menu to a specific region of an image stored in advance in order to simplify menu execution in a mobile terminal.

Yet another aspect of the present invention is to provide an apparatus and a method for performing an operation corresponding to a specific relevant region when the specific relevant region to which a shortcut for executing a menu is mapped is selected in a mobile terminal.

In accordance with an aspect of the present invention, an apparatus for controlling functions in a mobile terminal is provided. The apparatus includes a controller for setting a menu for controlling a function at a specific region of an output image, and selecting the specific region of the output image to execute the menu set at the relevant specific region.

In accordance with another aspect of the present invention, a method for controlling functions in a mobile terminal is provided. The method includes setting a menu for controlling a function at a specific region of an output image. The method also includes selecting the specific region of the output image to execute the menu set at the relevant specific region.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A illustrates a view of a phonebook screen of a mobile terminal according to an embodiment of the present invention; and FIG. 4B illustrates a view of a process for controlling a phonebook function using an image to which menu setting has been applied in a mobile terminal according to an embodiment of the present invention.

Throughout the drawings, like reference numerals will be understood to refer to like parts, components and structures.

DETAILED DESCRIPTION OF THE INVENTION

FIGS. 1 through 4B, discussed below, and the various embodiments used to describe the principles of the present disclosure in this patent document are by way of illustration only and should not be construed in any way to limit the scope of the disclosure.

Embodiments of the present invention provide an apparatus and a method for simplifying menu execution of a mobile terminal by mapping a shortcut for executing a menu to a specific region of an image stored in advance using the mobile terminal. When the specific region of the image to which the shortcut has been mapped is selected, an operation corresponding to the relevant specific region is performed.

Figure 1:
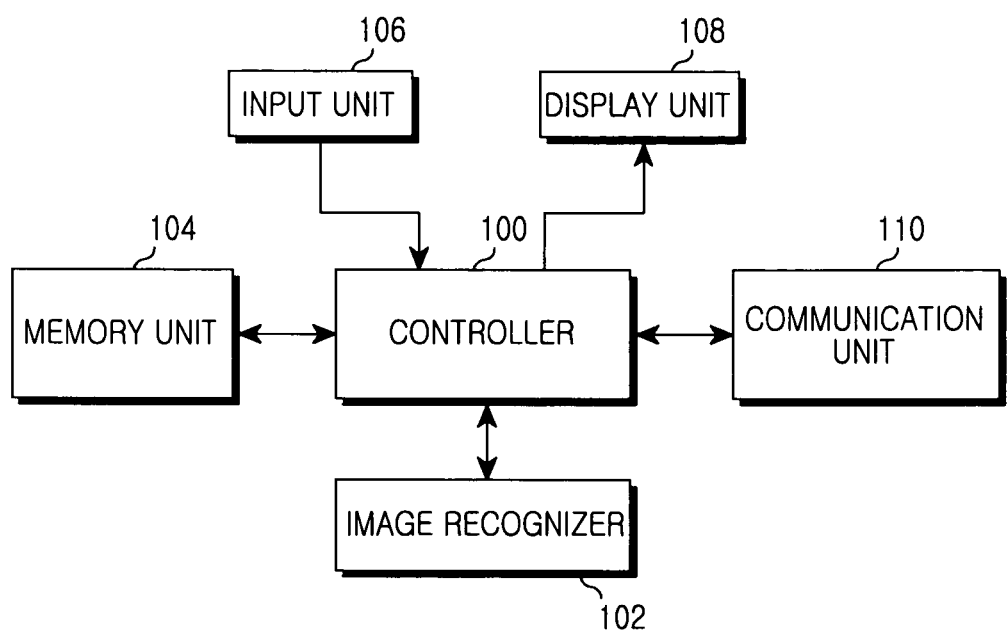
FIG. 1 illustrates a construction of a portable terminal for executing a menu using an image according to an embodiment of the present invention.

FIG. 1 illustrates a construction of a portable terminal for executing a menu using an image according to an embodiment of the present invention.

Referring to FIG. 1, the mobile terminal may include a controller 100, an image recognizer 102, a memory unit 104, an input unit 106, a display unit 108, and a communication unit 110.

The controller 100 of the mobile terminal controls an overall operation of the mobile terminal. For example, the controller 100 performs processes and controls for voice communication and data communication. In an implementation, the controller 100 controls the mobile terminal through a specific region of an image.

More particularly, the controller 100 sets a function for controlling the mobile terminal at a specific region of an image that was stored in advance; that is, the controller 100 sets a menu for controlling the mobile terminal.

Additionally, the controller 100 outputs the image to which the menu has been set. When a user selects the specific region of the image, the controller 100 determines the function that was mapped to the specific region, and performs the relevant function.

At this point, the controller 100 may set the menu at a specific region of the image detected by the image recognizer 102, or set the menu at a region selected by a user of the mobile terminal.

For example, the controller 100 maps a function such as a saving a memo, storing a phone number, transmitting a message, placing a call, and so forth, to a specific region of an image, and performs the mapped function when the specific region is touched or selected by the user.

The image recognizer 102 detects the specific region of the image under control of the controller 100 to allow the controller 100 to map a menu selection at the specific region.

The memory unit 104 may include Read Only Memory (ROM), Random Access Memory (RAM), a flash ROM, and the like. The ROM stores microcodes of programs for processes and controls of the controller 100 and the image recognizer 102, and various reference data.

The RAM serves as a working memory of the controller 100, and may store temporary data generated during the execution of various programs. Additionally, the flash ROM stores updatable data for storage such as a phonebook, transmitted messages, received messages, and the like.

The input unit 106 may include a plurality of buttons such as numerical key buttons of 0 to 9, a menu button, a cancel (delete) button, an OK button, a TALK button, an END button, an Internet access button, navigation key (or direction key) buttons, letter input keys, and the like, and provides key input data (for example, a menu setting request) corresponding to a key pressed by a user to the controller 100.

The display unit 108 displays status information, a limited number of letters, a large amount of moving images and still images, and so forth, generated during an operation of the mobile terminal. The display unit 108 may be a color Liquid Crystal Display (LCD) and display an image where a menu for controlling the mobile terminal has been set according to an embodiment of the present invention.

The communication unit 110 transmits/receives a Radio Frequency (RF) signal comprising data via an antenna (not shown). For example, during transmission, the communication unit 110 channel-codes and spreads data to be transmitted, and then performs an RF process on the signal to transmit the signal. During reception, the communication unit 110 converts a received RF signal into a baseband signal, and despreads and channel-decodes the baseband signal to recover data.

In an embodiment, the role of the image recognizer 102 may be performed by the controller 100 of the mobile terminal. The separate configuration and illustration of the image recognizer 102 is for an exemplary purpose only, not for limiting the scope of the present invention. Those skilled in the art would recognize that various modifications may be made within the scope of the present invention. For example, all of functions of the image recognizer 102 may be performed by the controller 100.

The present disclosure has described an apparatus for mapping a menu shortcut to a specific region of a stored image stored in a mobile terminal. When the specific region of the image to which the shortcut has been mapped is selected, an operation corresponding to the specific region is performed. A method for simplifying menu execution of the mobile terminal using the above-described apparatus according to an embodiment of the present invention will now be described.

Figure 2:
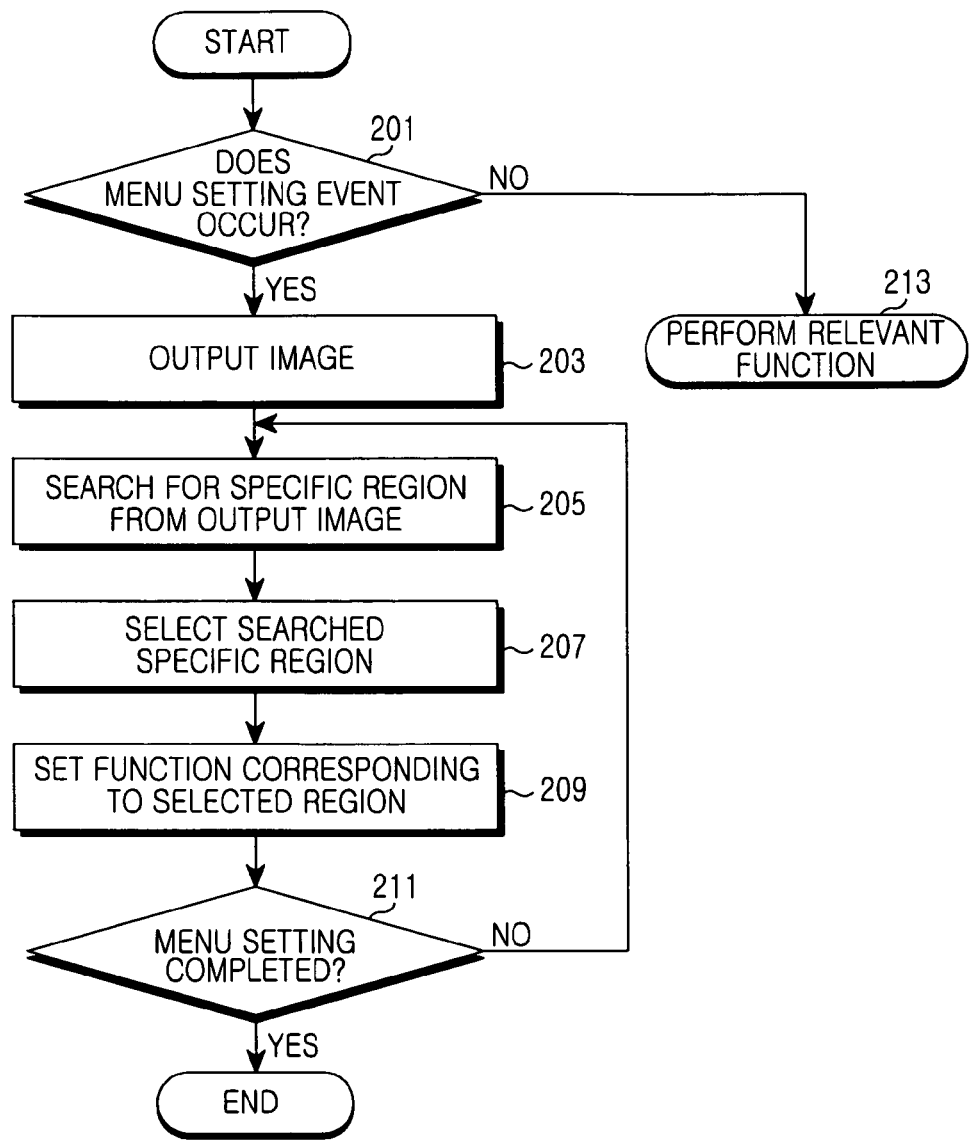
FIG. 2 illustrates a process for setting a menu of a mobile terminal according to an embodiment of the present invention.

FIG. 2 illustrates a process for setting a menu of a mobile terminal according to an embodiment of the present invention.

Referring to FIG. 2, the mobile terminal determines whether a menu setting event occurs in block 201.

Here, the menu setting event denotes an operation for mapping a menu shortcut for controlling an operation of the mobile terminal at a specific region of an image according to an embodiment of the present invention.

When determining that a menu setting event does not occur in block 201, the mobile terminal performs a relevant function (for example, a stand-by mode) in block 213.

In contrast, when determining that a menu setting event occurs in block 201, the mobile terminal outputs an image on which menu setting is to be performed in block 203.

The mobile terminal searches for a specific region on the output image at which a menu shortcut may be set block 205, and allows a user of the mobile terminal to select the specific region on which a menu shortcut corresponding to an operation is to be mapped in block 207.

Here, the mobile terminal searches for a specific region to which a menu for controlling an operation of the mobile terminal is to be mapped. In the case of an image of a person, the mobile terminal may search for a specific region such as a facial region and a hand region of the image to which a menu shortcut may be set.

The mobile terminal maps a function to the region selected by the user of the mobile terminal in block 209, and determines whether menu setting has been completed in block 211. Here, when the user selects a specific region of an image, the mobile terminal may output a list of menu categories (for example, phone number storing, call connection, Short Message Service (SMS) transmission, a memo, and the like) that may be mapped at the specific region, and allow the user to select a menu shortcut to assign to the specific region.

Additionally, when mapping a function related to call connection or SMS transmission at the image, the mobile terminal may map a contact's phone number to allow the user of the mobile terminal to perform call connection or SMS transmission to the contact included in the image. That is, the user of the mobile terminal uses a person's face that is included in an image instead of a user name stored in a phonebook. This removes inconvenience of having to search for and select a name when using a phonebook function provided by an existing mobile terminal, thus helping the user of the mobile terminal when the user cannot recall a contact's name when trying to place a call or send an SMS the contact.

Therefore, the user of the mobile terminal may set a specific menu shortcut at a specific region of the image. Thereafter, touching or selecting the specific region of the image will trigger the mobile terminal to perform a corresponding function that has been mapped to the specific region of the image.

When determining that the menu setting has not been completed in block 211, the mobile terminal returns to block 205 and repeats the menu setting procedure.

When determining that the menu setting has been completed in block 211, the mobile terminal stores relevant menu setting information and ends the menu setting procedure.

A method for detecting a specific region from an output image and setting a menu corresponding to the detected region, according to an embodiment of the present invention, has been described with regard to FIG. 2. Another embodiment of the present invention may allow a user to directly select a region for menu setting without detecting a specific region of an image, and to map a menu shortcut to the region, thereby mapping an operation that corresponds to the menu shortcut even when a mobile terminal cannot detect a specific region such as a face.

Figure 3:
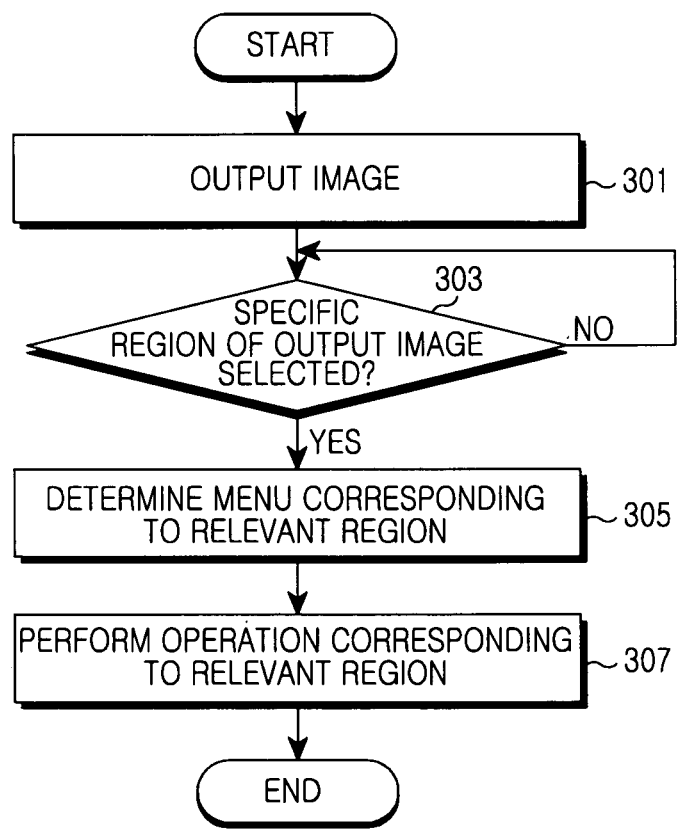
FIG. 3 illustrates a process for executing a service using an image to which menu setting has been applied in a mobile terminal according to an embodiment of the present invention.

FIG. 3 illustrates a process for executing a service using an image to which a menu shortcut has been mapped in a mobile terminal according to an embodiment of the present invention.

Referring to FIG. 3, the mobile terminal outputs a stored image in block 301. Here, the output image denotes an image in which a menu for controlling an operation of the mobile terminal has been set in a specific region. The present invention is described using phonebook features with the above-described image as an example. That is, the mobile terminal assumes that a user selects an image of at least one person for which a phonebook function is to be used from images of a plurality of users forming a phonebook.

The present invention relates to controlling an operation of a mobile terminal using an image but is not limited to phonebook functions.

The mobile terminal determines whether a user of the mobile terminal selects a specific region of the output image in block 303. Here, the specific region denotes a region to which a menu shortcut for controlling an operation of the mobile terminal has been mapped.

When determining that the user does not select the specific region of the image in block 303, the mobile terminal returns to block 303.

In contrast, when determining that the user selects the specific region of the image in block 303, the mobile terminal determines a menu shortcut for controlling an operation of the mobile terminal that is mapped to the relevant specific region in block 305, and performs an operation corresponding to the relevant specific region in block 307.

For example, on the assumption that a user of the mobile terminal has mapped the menu shortcut for placing a call to a facial region of a relevant image and sets an SMS menu shortcut at a hand region of the image, when the user of the mobile terminal selects the facial region of the relevant image, the mobile terminal performs an operation for placing the call. At this point, the mobile terminal immediately performs a call connection to the contact related to the relevant image. In contrast, when the user of the mobile terminal selects the hand region of the relevant image, the mobile terminal performs an operation that corresponds to the mapped SMS menu shortcut.

At this point, the mobile terminal displays a text input interface in which a phone number of the contact related to the relevant image has been input on the display unit, and performs a relevant function without inputting a separate key for the SMS.

After that, the mobile terminal ends the process.

FIGS. 4A and 4B illustrate screens of a phonebook function using an image to which a menu setting has been applied in a mobile terminal according to an embodiment of the present invention.

FIG. 4A illustrates a view of a phonebook screen of a mobile terminal according to an embodiment of the present invention.

Referring to FIG. 4A, the mobile terminal displays people's images that are stored in a phonebook. Here, the phonebook function denotes a phonebook list 401 formed of images containing faces of people according to an embodiment of the present invention, not the conventional phonebook list formed of texts. Additionally, an image of the phonebook list 401 includes contact information such as a contact's phone number, birth date, address, electronic (e)-mail address, and the like, that correspond to the image, such that the user of the mobile terminal can recognize a contact's face included in relevant displayed image and may use the image to place a of call, send an SMS transmission, and compose an e-mail to the contact.

FIG. 4B illustrates a view of a process for controlling a phonebook function using an image to which menu setting has been applied in a mobile terminal according to an embodiment of the present invention.

FIG. 4B illustrates a situation where a user of the mobile terminal uses a phonebook function on an image of a person who is boxing.

It is assumed that the user who intends to use the above phonebook function has set (i.e. mapped) a first menu shortcut for sending an SMS transmission at a facial region 410 of the image of the person who is boxing, and set a second menu shortcut for placing a call at a hand region 420. The image of the person who is boxing may also be mapped to a particular contact, such that each menu shortcut that is mapped on the image is associated with the contact (e.g., placing a call, sending an SMS transmission, composing e-mail, and so forth).

Accordingly, when the user of the mobile terminal touches or selects the facial region 410 of the displayed image, the mobile terminal outputs a Send Message screen 412 that allows the user of the mobile terminal to transmit an SMS message to a contact.

In contrast, when the user of the mobile terminal touches or selects the hand region 420 of the displayed image, the mobile terminal outputs a Call Connection screen 422 for placing a call to a contact.

At this point, because the mobile terminal has stored information of the contact, to whom the image of the person who is boxing is assigned, the mobile terminal may perform the operation that corresponds to the menu shortcut without selecting a separate menu.

By using a mobile terminal according to an embodiment of the present invention, a user may perform place a call or send a message to a contact, even when the user of the mobile terminal cannot recall the contact's name, by recognizing the image (such as a stored image of the contact) assigned to the contact. Such a feature would be beneficial to identify contacts to whom.

Embodiments of the present invention provide an apparatus and a method for simplifying menu execution of a mobile terminal. A shortcut for executing a menu function is mapped to a specific region of an image stored in the mobile terminal. When the specific region of the image to which the shortcut is mapped is selected, an operation that corresponds to the menu function that was mapped to the specific region is performed. Therefore, a complicated process that needs to be performed when a menu or a sequence of screens is navigated in the conventional mobile terminal may be simplified, and user convenience may be increased.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus comprising:
a display unit configured to display a list of human images, each human image comprising a particular set of contact information different from one another;
an input unit configured to receive an human image selection input, a first user input and a second user input from a user of the apparatus to one of the human images; and
a controller configured to:
select, according to the image selection input, an human image from the list of human images;
responsive to receiving the first user input on the selected human image, map a plurality of functions of the apparatus to a corresponding plurality of portions of the selected human image; and
responsive to receiving the second user input on the selected human image, perform a function of the plurality of functions associated with a mapped portion of the plurality of portions of the selected human image using the particular set of contact information of the selected human image.

2. The apparatus of claim 1, wherein the controller is configured to:
receive the first user input for defining the one portion of the displayed image, and
map the one function of the apparatus to the one portion of the displayed image, and
store the image.

3. The apparatus of claim 2, wherein the controller is configured to display a list of the functions of the apparatus when the first user input is received.

4. The apparatus of claim 2, wherein the controller is further configured to generate a phonebook list using the stored image.

5. The apparatus of claim 1, wherein the functions of the apparatus comprise at least one of saving a memo, placing a call, transmitting a message, adding a phone number, and composing an electronic (e)-mail.

6. The apparatus of claim 1, wherein when the one portion of the displayed image, to which the one function has been mapped, is selected, the controller is further configured to determine the one function mapped to the one portion and perform an operation corresponding to the determined function.

7. A method for operating an apparatus, the method comprising:
displaying a list of human images, each human image corresponds to a particular set of contact information different from one another;
selecting an human image from the list of human images according to an image selection input;
displaying the selected human image;
responsive to receiving the first user input on the selected human image, mapping a plurality of functions of the apparatus to a corresponding plurality of portions of the human image; and
responsive to receiving the second user input on the selected human image, performing a function of the plurality of functions mapped to a portion of the plurality of portions of the selected human image using contact information of the selected human image.

8. The method of claim 7, further comprising:
receiving the first user input for defining the portions of the displayed image;
mapping the functions of the apparatus to the portions of the displayed image; and
storing the image.

9. The method of claim 8, further comprising:
generating a phonebook list using the stored image.

10. The method of claim 7, further comprising:
displaying a list of the functions of the apparatus when the first user input is received.

11. The method of claim 7, wherein the functions of the apparatus comprise at least one of a menu for controlling at least one of a set of operations, the set of operations comprising at least saving a memo, placing a call, transmitting a message, adding a phone number, and composing an electronic (e)-mail.

12. The method of claim 7, further comprising:
when the one of the portions of the displayed image to which one of the functions has been mapped is selected, determining the one function mapped to the one portion; and
performing an operation corresponding to the determined one function.

13. A portable terminal, comprising:
a display unit configured to display a list of human images, each human image comprising a particular set of contact information different from one another, and to receive an image selection input, a first user input and a second user input from a user of the portable terminal to the image; and
a controller configured to:
select, according to the image selection input, an human image from the list of human images;

responsive to receiving the first user input on the selected human image, map a plurality of functions of the portable terminal to a corresponding plurality of portions of the human image; and responsive to receiving the second user input on the selected human image, perform, a function of the plurality of functions mapped to a corresponding portion of the plurality of portions of the selected image using contact information of the selected human image.

14. The portable terminal of claim 13, wherein the controller is further configured to:

receive user input for defining the portions of the displayed image, map the functions of the portable terminal to the portions of the image, and store the image.

15. The portable terminal of claim 14, wherein the controller is further configured to generate a phonebook list using the stored image.

16. The portable terminal of claim 13, wherein the controller is further configured to display a list of the functions for controlling the apparatus when the first user input is received.

17. The portable terminal of claim 13, wherein the functions of the apparatus comprise at least one of saving a memo, placing a call, transmitting a message, adding a phone number, and composing an electronic (e)-mail.

18. The portable terminal of claim 13, wherein when the corresponding portion of the displayed image, to which the functions have been mapped, is selected, the controller is further configured to determine a corresponding function to the corresponding portion and perform an operation corresponding to the determined function.

19. A portable terminal comprising:

a display unit configured to display a list of contacts formed of human images, each human image comprising a particular set of contact information different from one another, and receive an image selection input, a first and a second touch input to the human image; and a controller configured to:

retrieve, according to the image selection input, the human image from the list of contacts;

specify a portion of the retrieved human image for mapping at least one of a plurality of functions of the portable terminal, in response to the first touch input on the retrieved human image; and perform a function with contact information of the contact depicted in the human image and mapped to the specified portion in response to the second touch input on the retrieved human image, wherein the plurality of functions comprises at least one of a call or a message function.

20. The apparatus of claim 19, wherein the controller is configured to:

receive the first touch input for defining the portion of the retrieved human image, map the function of the portable terminal to the portion of the retrieved human image, and store the human image.

* * * * *